E. G. GAGE.
ELECTROLYTIC OSCILLATOR.
APPLICATION FILED JULY 13, 1917.
1,329,761.
Patented Feb. 3, 1920.
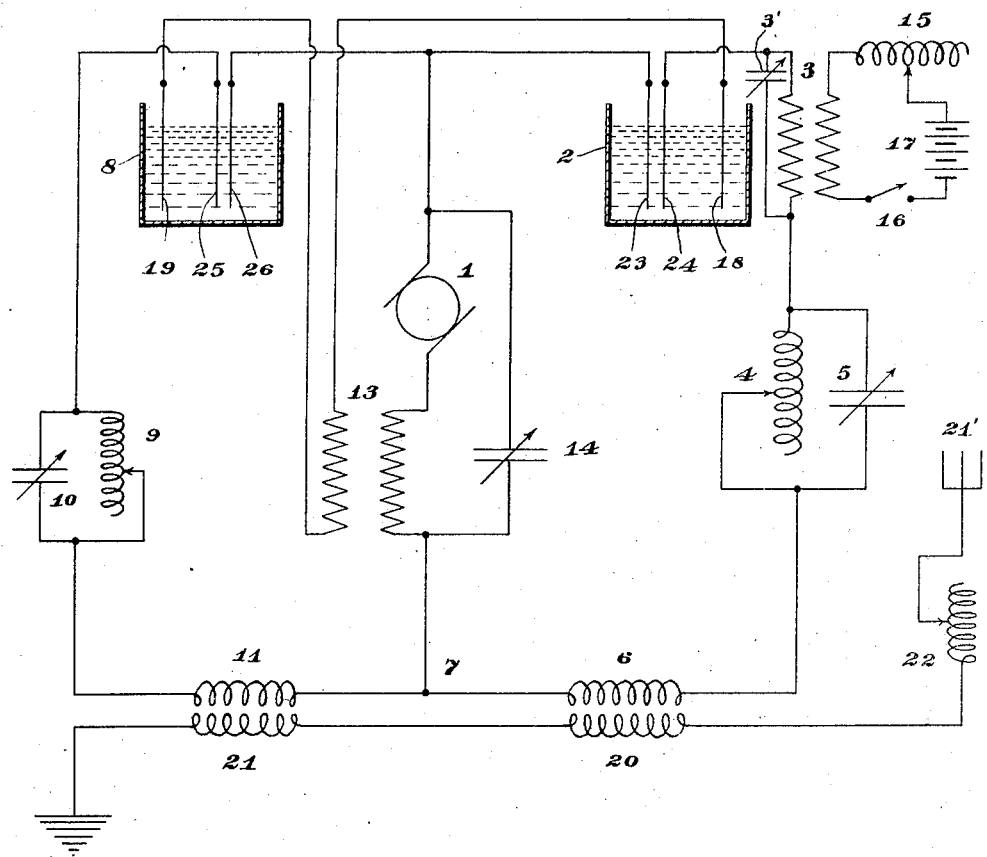
Edward G. Gage, Inventor
By his Attorney
Thomas Howe

UNITED STATES PATENT OFFICE.

EDWARD G. GAGE, OF SOUTH NORWALK, CONNECTICUT.

ELECTROLYTIC OSCILLATOR.

1,329,761.  Specification of Letters Patent.  Patented Feb. 3, 1920.

Application filed July 13, 1917. Serial No. 180,292.

*To all whom it may concern:*

Be it known that I, EDWARD G. GAGE, a citizen of the United States, residing at South Norwalk, county of Fairfield, State of Connecticut, have invented new and useful Improvements in Electrolytic Oscillators, of which the following is a specification.

This invention relates to apparatus for producing electrical oscillations of high frequency which may be employed in radio telegraphy or telephony and in other applications, and in particular it relates to such means in which electrolytic cells are employed for causing the oscillations.

It is well known that certain electrolytic cells have the property of opposing the flow of electric current by reason of barriers built up therein through electrolytic action. This action is taken advantage of for the purpose of rectifying alternating currents in that class of cells in which a current barrier is electrolytically built up when the current tends to pass in one direction but permits current to flow in the opposite direction. The present invention utilizes such cells, the electrolytic barrier serving to normally prevent current flow in the oscillation circuit, while the barrier is removed at suitable intervals to permit current to pass. This is not to be confounded with instruments of the Wehnelt type wherein bubbles of gas momentarily cause a barrier across a path through an electrolyte. The cells of the present invention depend for the removal of the electrolytic barrier on the application of an exterior agency which may be caused to operate at the desired frequency so that the frequency can be regulated and not be dependent upon gravitational or other effects within the cell which are unregulable and are not of sufficiently high frequency for radio telephone and telegraph work and for other purposes. On the other hand, my invention is adapted to provide current surges of high frequencies.

The invention further contemplates the relation of cells of the character described and means for operating the same such that the cycle of operations will be repeated automatically so that the current surges will continue indefinitely.

Other and ancillary objects of the invention will appear hereinafter.

The accompanying drawing is a diagram showing an illustrative arrangement of apparatus embodying the invention.

Referring to the drawings, direct current generator 1 has one branch of its circuit through the electrolytic cell 2, the secondary of the kick coil 3 and the variable condenser 3' in parallel, the variable reactance 4 and variable condenser 5 in parallel, and the coil 6 to the junction 7. Similarly another branch of the circuit is through the electrolytic cell 8, the variable reactance 9 and variable condenser 10 in parallel and the coil 11 to the junction 7. From this junction a connection common to both branches passes to the other terminal of the generator through the primary of a step up transformer 13, a variable condenser 14 being connected across it and the generator. The primary of the kick coil 3 has in circuit with it a reactance coil 15, a circuit closing key 16 and a battery 17. The secondary of the transformer 13 has its terminals respectively connected to electrodes 18 and 19 of the cells 2 and 8. The coils 6 and 11 are respectively coupled with the coils 20 and 21 in the open circuit of a radio system grounded at one end as shown, having an aerial 21' and including a variable reactance 22. The coils 6 and 11 are wound in opposition so that surges of current in opposite directions in the branches of the oscillation circuit will cause surges in the proper direction in the aerial, there being no coupling relationship between the pair of coils 6 and 20 on the one hand and the pair of coils 11 and 21 on the other.

The electrodes 23 and 24 of one cell and 25 and 26 of the other are of aluminum while the electrodes 18 and 19 are of lead. The electrolyte is a solution of sodium bicarbonate which may be formed in the proportions of one-half pound of sodium bicarbonate to one gallon of water. The cells should be kept at a fairly low temperature, say 20° C. Convenient sizes for the electrode plates are an area of one hundred square inches for the aluminum while the corresponding lead electrodes may each have from ten to one hundred square inches. It is desirable to place the aluminum electrodes of a cell as close together as possible, say one sixty-fourth of an inch apart, and they may be separated by a perforated hard rubber plate. The lead electrode is spaced from the aluminum a distance depending upon the density of the solution, voltage, etc., usually being about two inches. In connection with apparatus of the above dimensions, a generator of 250 volts is suitable with suitable means for regulating it between fifty and two hundred and fifty volts. The transformer 13 may have a ten to one ratio and it and the generator are shunted by a condenser as described to afford a bypass for oscillating current, the condenser 3' being provided to form a by-pass about the primary of the coil 3; the variable reactances 4 and 9 are each about five hundred microhenries, each of the condensers 5 and 10 have a capacity of approximately .005 microfarads and the inductances of the coils 6 and 11 are each of the order of one hundred microhenries according to the wave lengths of the oscillating circuit.

With the apparatus connected as above, the polarity of the generator being such as to tend to force current through the cell in that direction to which the cells interpose barriers, no current will flow in either of the branches containing the cells. If now the key 16 be closed and opened, an inductive kick will be produced in the branch circuit containing the cell 2, which will start the apparatus in operation and produce oscillating currents through the coils 11 and 6 and consequently in the open radio circuit. After having been thus set in operation, the apparatus continues its operation automatically to produce the oscillating currents. The reason for this operation, I believe to be as follows:

The high potential kick caused by the closing and opening of the key 16 operates to remove the barrier opposed by the cell 2 to the passage of current between the aluminum electrode plates 23 and 24. These plates form a condenser with a dielectric of gas bubbles or film at the surface of the aluminum, the formation of such gases being well understood in connection with the use of aluminum cells as rectifiers. The barrier having thus been removed, current rushes from the aluminum electrodes of the cell 8 as a condenser, through the broken down condenser, so to speak, of the cell 2, thereby inducing a current in the aerial. This causes such unbalancing of the circuits that there will be a rush of current through the primary of the transformer 13, which will induce a high potential across the lead electrodes,—the dielectric gaseous film, having meanwhile been rapidly built up in the cell 2. The high potential applied to the lead electrodes, will remove the current barrier between the aluminum plates of the cell 8 when there will be a rush of current from the branch containing the cell 2 into the branch containing the cell 8, which will induce a current in the opposite direction in the aerial. This unbalancing again throws high potential on the lead electrodes, which removes the current barrier in the cell 2, the dielectric film having meanwhile built up in the cell 8. The cycle of operations as just described, will then be repeated indefinitely, the current flowing back and forth with an extremely high frequency.

While the invention has been illustrated in what is considered its best application, it may have other embodiments without departing from its spirit, and is not therefore, limited to the structure shown in the drawing.

What I claim as new and desire to secure by Letters Patent, is—

1. In an oscillator, the combination with a source of current, of a circuit therefor comprising an electrolytic cell adapted to prevent current flowing in said circuit and means for removing the opposition of said cell to the flow of said current.

2. In an oscillator, the combination with a source of direct current of a circuit therefor comprising an electrolytic cell having an aluminum electrode adapted to prevent current flowing in said circuit and means for applying an increased potential to remove the opposition of said cell to current flow.

3. In an oscillator circuit, the combination of a source of electromotive force, an electrolytic cell normally barring the flow of current in said circuit and means for removing the opposition of said cell to current flow, said means being controlled by the fluctuation of current in said circuit.

4. In an oscillator circuit, the combination of a source of electromotive force, an electrolytic cell normally barring the flow of current in said circuit; means for removing the opposition of said cell to current flow, whereby a surge of current is produced, said means being controlled by the fluctuation of current in said circuit, a second circuit and means for transferring the current surges to said second circuit.

5. In an oscillator, the combination with a source of direct current of a circuit therefor comprising an electrolytic cell having an aluminum electrode adapted to prevent current flowing in said circuit, means for applying an increased potential to remove the opposition of said cell to current flow, whereby a surge of current is produced, a second circuit and means for transferring the current surges to said second circuit.

6. In an oscillator circuit, the combination of an electrolytic cell, a source of current and means for alternately removing the opposition of said cell to current flow and permitting the cell to build up a barrier to oppose said current flow.

7. In an oscillator circuit, the combination with a source of direct current of a circuit therefor comprising branches in parallel, each including an electrolytic cell having an aluminum electrode, and means controlled by fluctuation of current in said circuit for causing the removal of the opposition of said cells to current flow.

8. In an oscillator circuit, the combination with a source of direct current of a circuit therefor comprising branches in parallel, each including an electrolytic cell having an aluminum electrode, and means controlled by the fluctuation of current in said circuit for applying high potential to said cells to remove their opposition to current flow.

In testimony whereof I have signed this specification this 12th day of July 1917.

EDWARD G. GAGE.